UNITED STATES PATENT OFFICE.

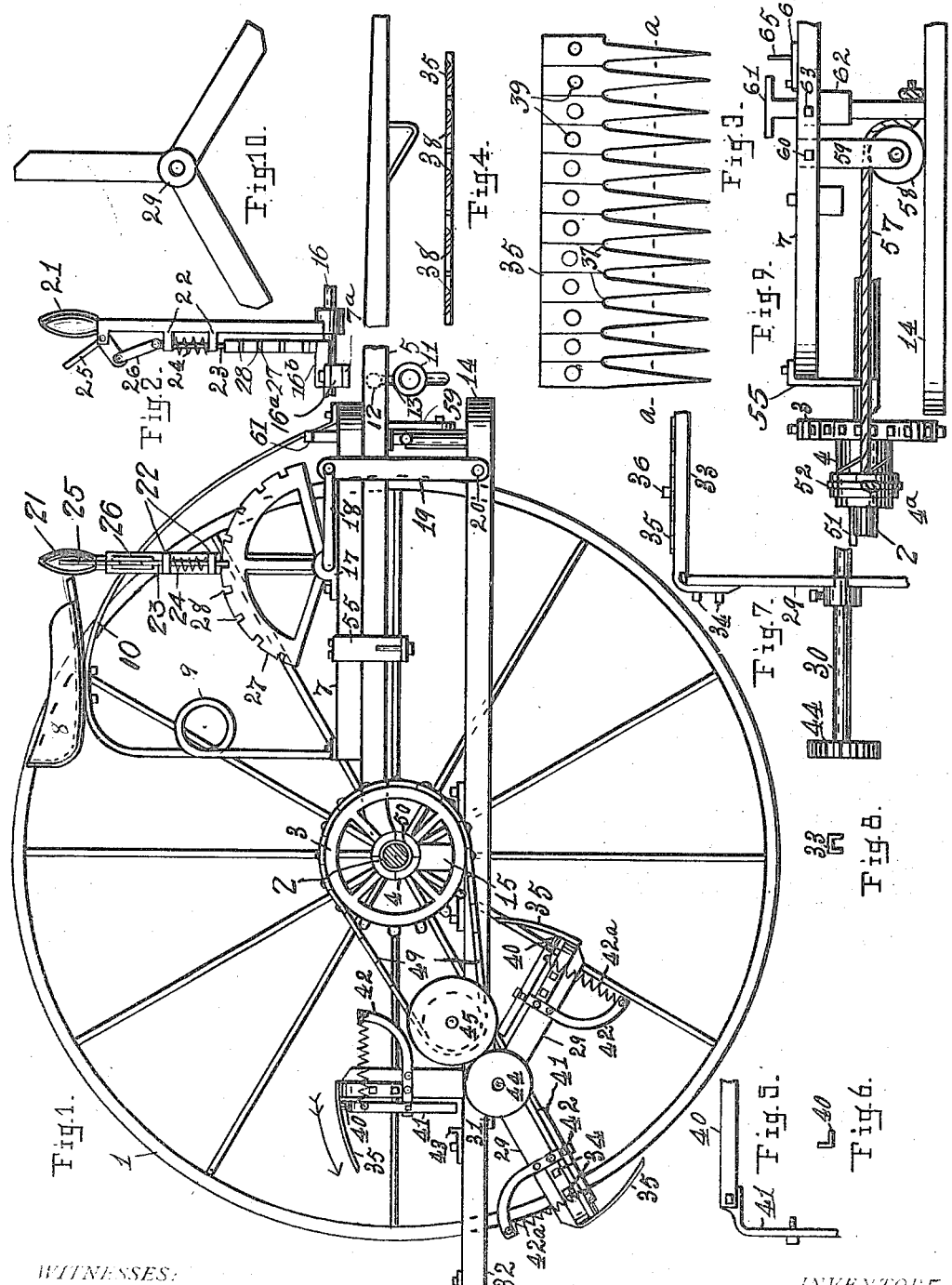

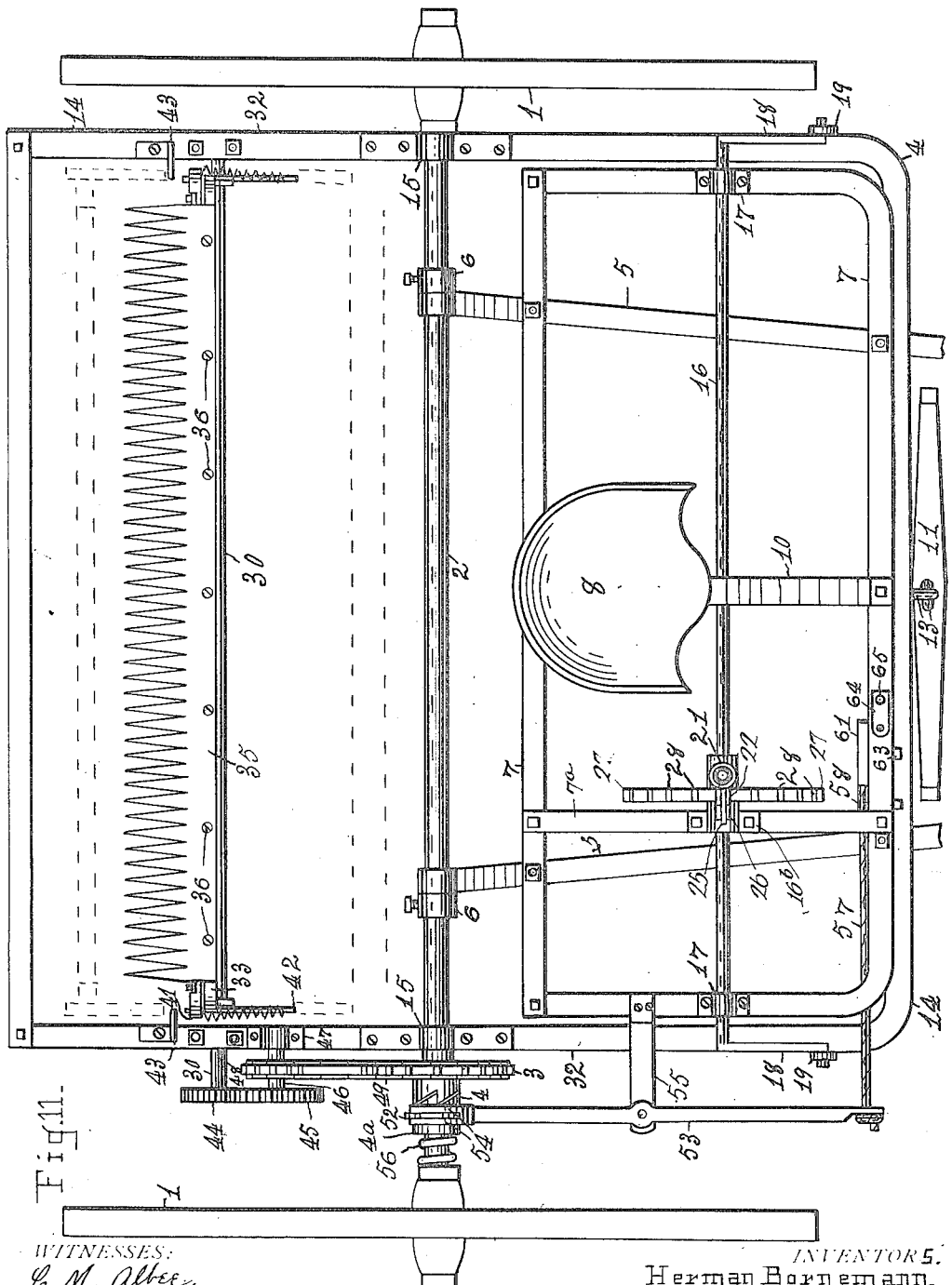

HERMAN BORNEMANN AND JOHN TENNESSEN, JR., OF DUNDAS, WISCONSIN.

THISTLE-ERADICATOR.

1,136,206. Specification of Letters Patent. Patented Apr. 20, 1915.

Application filed July 28, 1913. Serial No. 781,545.

*To all whom it may concern:*

Be it known that we, HERMAN BORNEMANN and JOHN TENNESSEN, Jr., citizens of the United States, and residents of Dundas, in the county of Calumet and State of Wisconsin, have invented a new and useful Thistle-Eradicator, of which the following is a specification.

Our invention is designed for pulling up or cutting off the blossom end of thistles which are growing in fields of grain, such as wheat, rye, oats, barley, &c. at a certain season in the growth of both the grain and thistles, that of the grain before it has headed out and of the thistles before the seeds have formed, and it consists of a two wheeled vehicle frame provided with a seat for the driver, to be drawn through the fields of grain by a light weight draft animal, an axle revoluble with the wheels, a sprocket wheel mounted loosely upon the axle, a supplemental frame for carrying thistle gathering mechanism, suspended from the axle, and a clutch upon the axle for making the thistle gathering mechanism inoperative when the vehicle is traveling in either direction.

The thistle gatherer is formed with a plurality of combs arranged to be revolved about a shaft arranged transversely of the vehicle, said shaft being carried upon said supplemental frame which is independent of the vehicle frame and is arranged to be adjusted in a vertical direction by the driver without stopping the machine, for bringing the lowest point of the revolving gatherer at the required height for gathering the thistles, the teeth of the combs passing freely between the spears of grain, but catching the thistle blossoms and heads, and if upon a light porous soil pulling the thistles up, while upon heavier soil, cutting and breaking the blossoms and heads off.

Each comb is provided with a cleaner, which automatically cleans the comb of its thistle heads, &c., after each passage thereof through the grain, and the object of the invention is, to eradicate the thistles from growing grain by pulling up the thistles or breaking off the blossom end, so that they cannot perpetuate themselves from their ripened seeds.

The invention is shown in the accompanying drawing, in which,—

Figure 1 is a side elevation of the machine, the wheel nearest the observer being removed, and showing one member of a clutch upon the axle. Fig. 2 is an elevation of a ratchet lever device for adjusting the supplemental frame, and the vertical position of the revolving comb reel. Fig. 3 is a plan of a portion of one end of a comb, upon a scale larger than that of Figs. 1 and 2, and Fig. 4 is a section across the teeth upon the line *a, a,* of Fig. 3, upon a still larger scale, the remaining figures being upon the same scale as Figs. 1 and 2. Fig. 5 is an elevation of one end of a comb cleaner, with its pivotal bolt therein. Fig. 6 is a transverse section of the cleaner bar. Fig. 7 is an elevation of one end of the comb carrying bar and a section of comb thereon, attached to one arm of a spider that is secured upon the comb reel carrying shaft. Fig. 8 is a transverse section of the comb carrying bar. Fig. 9 is an elevation of part of the front ends of vehicle and supplemental frames, and the clutch releasing device. Fig. 10 is an end elevation of a spider which forms an end of the comb reel. Fig. 11 is a plan of the machine, the thills being broken near the whiffletree, and the position of the two lower combs being approximately shown in dotted lines.

Similar numerals and letters indicate like parts in the several views.

1, indicates the two wheels of a vehicle; 2, its axle, revoluble with the wheels; 3, a sprocket wheel mounted loosely upon the axle and forming one member of a clutch 4; 5, thills by which the vehicle can be supported in part by the draft animal; 6, set collars upon the axle for holding the thills in position thereon; 7, a frame mounted upon the thills and bolted thereto; 8, a seat for the driver of the vehicle; 9 and 10, spring arms upon which the seat is supported; 11, a whiffletree connected with a cross bar 12, between the thills (shown in dotted lines in Fig. 1,) by means of staples 13; 14, a supplemental frame suspended by hanger journal boxes 15, from the axle; 16, a shaft, journaled at 17, upon the frame 7, provided with a crank 18, at each end, with a link 19 from each crank to the frame 14, to which the links are connected by means of bolts 20.

Secured upon the shaft 16, is a handle bar 21, provided with keepers 22, and a rod 23 arranged to slide within said keepers, said rod having a spring 24 for normally holding the rod at the lowest limit of its movement, and at its upper end having an angular hand piece 25 and link 26, for raising the rod against its spring 24.

A cross piece 7ª, is arranged across the frame 7 and is formed of a flat bar of metal and is provided under the shaft 16, with a journal box 16ª and a journal box cap 16ᵇ, is secured to said journal box. Integral with said cap piece is a segment 27, which is provided with notches 28, for receiving the lower end of the rod 33. This handle bar is located beside the seat 8 and within easy reach of the driver. By raising the rod 23 clear of the notch in the segment, the shaft 16 can be turned in either direction for raising or lowering the rear end of the frame 14, and the thistle gathering comb reel thereon.

The reel consists of two spiders 29, secured upon a shaft 30, which shaft is mounted for revolution in journal boxes 31, which are secured to the side pieces 32 of the frame 14. In the present case they are secured upon the under side of the frame, but not necessarily so, as the frame 14 can be suspended below the axle any desired amount and the frame swung downward as required. The spiders in the present case have each three arms, but we do not confine their construction to any particular number. The two corresponding arms of the spiders are connected together with channel bars 33 and bolts 34. Upon the broad surface of each of the three channel bars, a comb 35, is secured with bolts 36.

The combs are formed of a sheet of thin steel, and each tooth may be a separate element, as indicated at Fig. 3, or be formed of sheets containing any desired number of teeth, as in Fig. 11. The spaces between the roots of the teeth are preferably curved, as at 37 in Fig. 3. Fig. 4 shows a cross section of the teeth in which they are ground to a sharp edge 38, along their side edges. Each tooth if separately made, or if a plurality are formed upon one sheet, then each sheet is provided with holes 39, by which they may be bolted to the channel bar. It will be observed that the teeth of the combs in Fig. 1 are curved in the direction of their length. The radius of their curve is preferably a little greater than the radius of the reel head for the better gathering of the thistles. Instead of being curved, the channel bar 33, may be secured to the spider arms at such an angle as will bring the points of the teeth into the position they would occupy if they were curved upon such a radius.

The comb cleaner consists of a bar 40, preferably of angle iron, as in Fig. 6, with the outside face of its angle arranged toward the points of the teeth, and the other arm of the angle extending under the bar to which the comb is secured. These pieces 40, should be a little longer than the comb and the channel bar to which the comb is secured, and at each end have an arm 41, of rectangular cross section, secured to them. Each arm 41, is pivotally mounted upon a curved arm 42, which is secured to a spider arm with rivets or otherwise, one end thereof extending from the spider arm in the direction the comb reel revolves for the pivoting thereon of said comb cleaner arm 41, and the other end extending in the opposite direction and curved upward for the attachment thereto of a spiral spring 42ª, the other end of the spring being connected to the arm 41, at a point between its pivotal point and the comb cleaner bar 40, and normally holding the cleaner bar 40, against the channel bar 33. The ends of the arms 41 extend toward the center of the reel, and in their path as the reel revolves, a stop 43, is secured upon the frame 14, the purpose of the stop being to arrest the free end of the arm and thereby swing the comb cleaner bar forward toward the points of the teeth for removing any accumulation of thistles between the comb teeth, as the reel revolves in the direction of the arrow in Fig. 1.

It will be evident that the vehicle in passing through fields of grain, will cause its wheels to revolve in a direction contrary to that indicated by the arrow in Fig. 1. To cause the reel to revolve in the direction of the arrow, a spur gear wheel 44, is secured to one end of the shaft 30, which wheel is in mesh with a larger gear wheel 45, that is mounted upon a stub shaft 46, said stub shaft being arranged for revolution in the journal box 47, and having secured thereon a small sprocket wheel that is made to revolve by means of a sprocket wheel chain 49, running around the sprocket wheel 3.

In Fig. 1, the spur gears 44 and 45, are shown as friction wheels, but in practice, cog wheels as in Fig. 11, will be used.

As it will be necessary to run the vehicle forward when it is not desired to operate the reel gatherer, in going to and from fields of grain, and backward in turning around in said fields, a clutch is provided near one of the wheels, one member of it, 4, being integral with the sprocket wheel 3, and loosely revoluble upon the axle between the collar 50, and hanger journal box 15, and the other member, 4ª, is secured upon the axle by means of a spline 51, and is provided with a projecting rib 52, fitted to be engaged by a lever 53, having prongs 54, for engaging said rib, the lever being pivoted intermediate its ends upon a bracket arm 55, which is secured upon the frame 7.

A spring 56, is arranged between the hub of the adjacent wheel and splined clutch member which normally holds the two clutch members in engagement. For releasing their engagement, a rope 57, is connected with the outer end of the lever 53, runs over a pulley 58, which is mounted upon a drop hanger 59, that is secured to the frame 7, with a bolt 60, and is connected to a foot piece 61, arranged to slide vertically in the holder 62, secured to the frame 7, with a bolt 63. When the comb reel is to be thrown out of action for a minute or so, the driver has only to press downward with his foot upon the foot piece 61, which will swing the lever 53, and separate the two clutch members, but if for a greater length of time, after pressing the foot piece downward, a button 64, that is pivoted upon the frame 7 can be swung over the foot piece for holding the clutch members disengaged.

A pin 65, extends upward from the button which can be engaged by the fingers or foot of the driver for turning the button.

Various changes in the material, form and construction, and in minor details, may be resorted to without departing from the principle or sacrificing any of the advantages of this invention.

Having described our invention, what we claim and desire to secure by Letters Patent, is,—

1. A thistle eradicator comprising a wheeled frame, a shaft mounted for revolution thereon, spaced apart heads secured to the shaft, a plurality of combs secured to said heads, a comb cleaner for each comb consisting each of a bar arranged inside of and longitudinally of the comb and pivotally mounted upon a pivotally mounted lever at each end of the reel head, a stop upon the machine frame arranged in the path of movement of the free ends of said levers and adapted to engage said free ends and swing the cleaner bars from behind the roots of their teeth toward their points at each revolution of said reel and a spring arranged for returning said bars to their normal position after they have been swung for cleaning the comb teeth.

2. A thistle eradicator comprising a wheeled frame, a shaft mounted for revolution thereon, spaced apart reel heads secured to said shaft, a plurality of combs secured to the reel heads, a comb cleaner for each comb consisting each of a bar arranged inside of and longitudinally of the combs and pivotally mounted at each end, a pivotally mounted lever connected to each end of each of said bars, a stop arranged upon said frame in the path of movement of the free ends of said levers for engaging said ends as the reel is revolved, and thereby swinging said comb cleaner bars from behind the roots of the comb teeth toward their points at each revolution of the reel head, and means for returning said bars to their normal position after they have been swung for cleaning the comb teeth.

HERMAN BORNEMANN.
JOHN TENNESSEN, Jr.

Witnesses:
  Chas. M. Johnson,
  Geo. A. Troyser.